P. DE MATTIA.
COLLAPSIBLE CORE AND CHUCK.
APPLICATION FILED JUNE 8, 1920.

1,389,438.

Patented Aug. 30, 1921.

WITNESSES

INVENTOR
PETER DE MATTIA

BY

ATTORNEYS

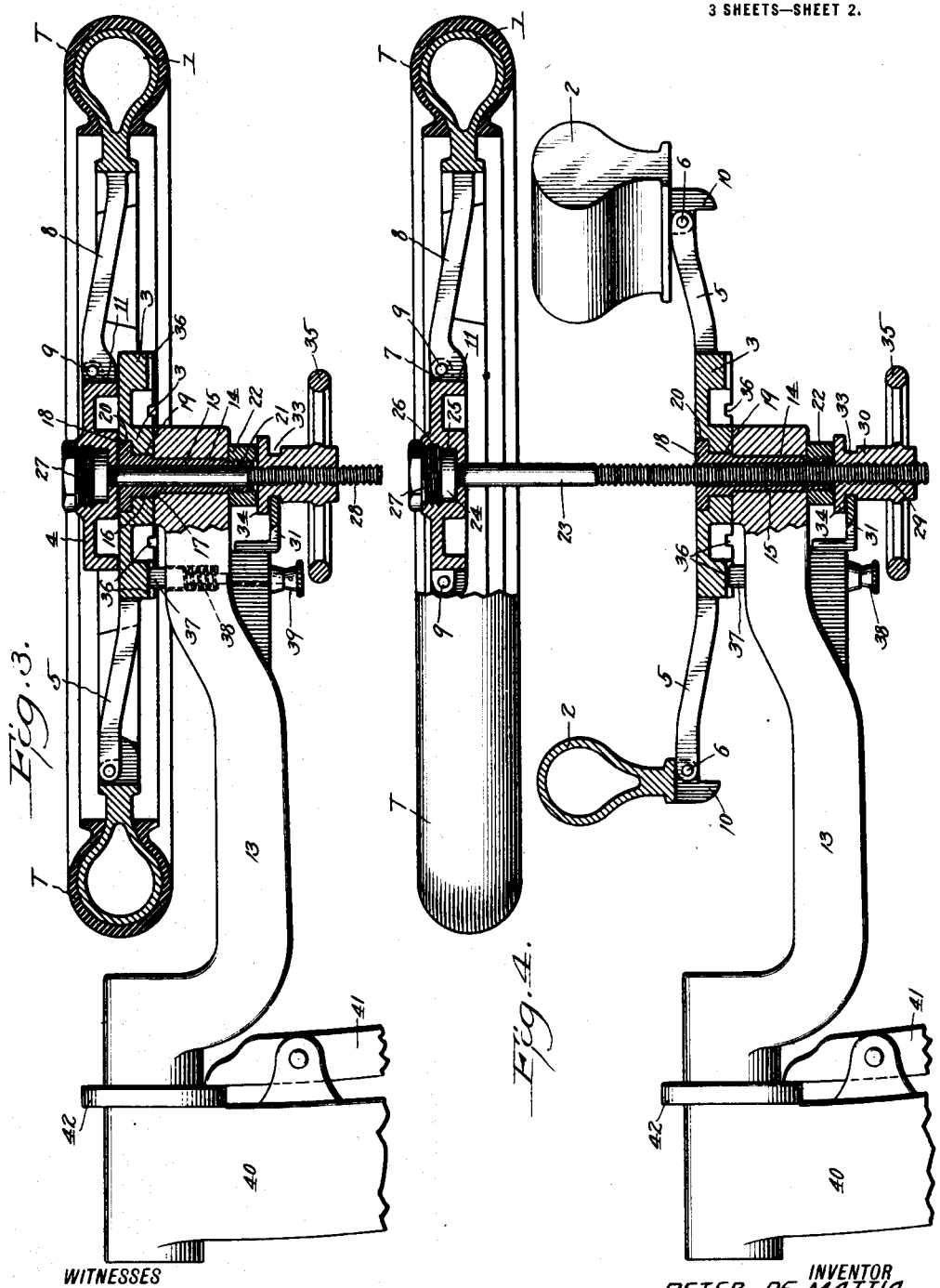

P. DE MATTIA.
COLLAPSIBLE CORE AND CHUCK.
APPLICATION FILED JUNE 8, 1920.
1,389,438.
Patented Aug. 30, 1921.
3 SHEETS—SHEET 3.
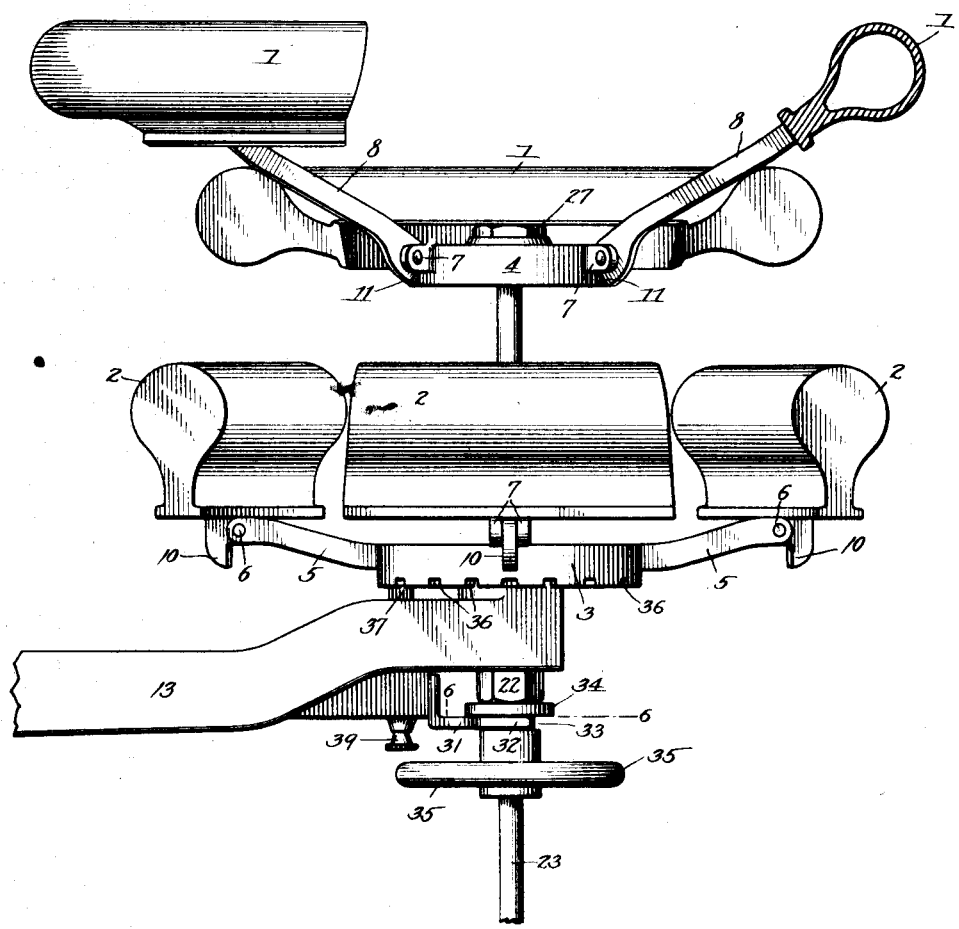
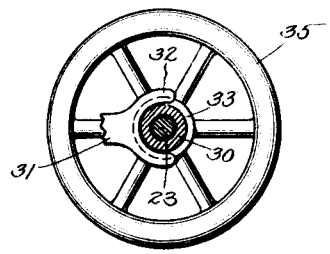
WITNESSES
INVENTOR
PETER DE MATTIA
BY
ATTORNEYS

UNITED STATES PATENT OFFICE.

PETER DE MATTIA, OF CLIFTON, NEW JERSEY.

COLLAPSIBLE CORE AND CHUCK.

1,389,438. Specification of Letters Patent. Patented Aug. 30, 1921.

Application filed June 8, 1920. Serial No. 387,413.

*To all whom it may concern:*

Be it known that I, PETER DE MATTIA, a citizen of the United States, residing at Clifton, in the county of Passaic, State of New Jersey, have invented certain new and useful Improvements in Collapsible Cores and Chucks, of which the following is a specification.

The present invention relates to collapsible cores and chucks for use in the manufacture of pneumatic tires, and it has for its object the production of a collapsible core and chuck so constructed that while affording an effective support for the tire while building up the carcass and the fabric into tire shape, it will permit ready disengagement of the built up tire from the core with a minimum effort on the part of the operator and with a minimum distortion of the tire.

To the above ends the present invention consists of a collapsible core comprising a plurality of groups of independently movable core sections, the sections of one group being alternately arranged with relation to the sections in another group, each group of sections being mounted upon independent supports, with means for moving one of the supports and its group of core sections with relation to another support and its group of core sections, whereby to make and break the continuity of the core.

The invention further consists of such a collapsible core in which the core sections are movably connected to their supports in such manner that the movement of one support, and its group of core sections, in a direction to break the continuity of the core, will automatically strip the tire from the other group of core sections.

The invention further consists of the devices and combinations of devices which will be hereinafter described and claimed.

The present invention is illustrated in the accompanying drawings in which—

Fig. 3 shows a sectional view taken on the line 3 to 3, in Fig. 1, also showing parts in elevation.

Fig. 4 shows the parts partly in section, and partly in elevation, and illustrating one group of core sections moved away from the other group of core sections, with the tire stripped from the latter group.

Fig. 5 shows in side elevation the groups of core sections moved away from each other, and illustrating the method of stripping the tire completely from the core sections, one of the core sections being shown in the cross section.

Fig. 6 illustrates a detail of the operating mechanism.

Similar reference characters will be employed throughout the specification and drawings to indicate corresponding parts.

Figure 1:
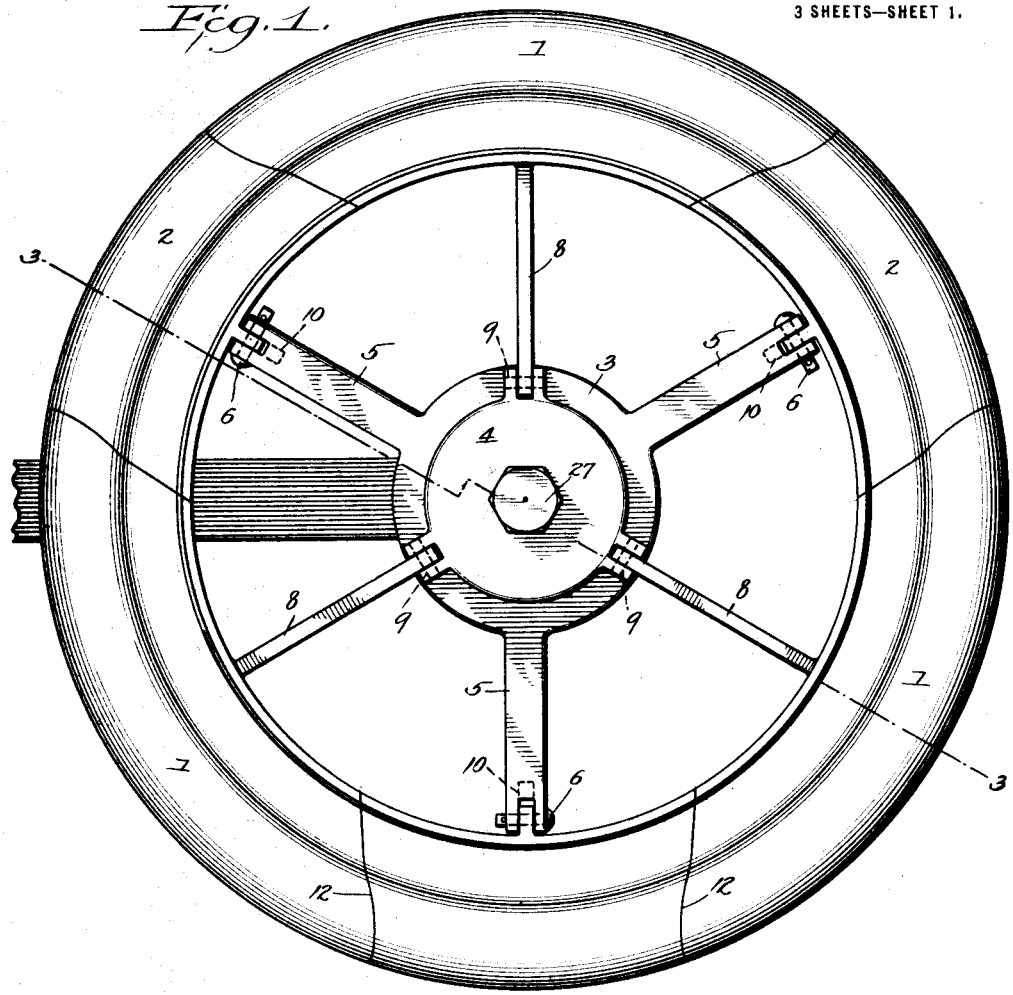
Figure 1 shows a front elevation of the collapsible core and its support.
Figure 2:
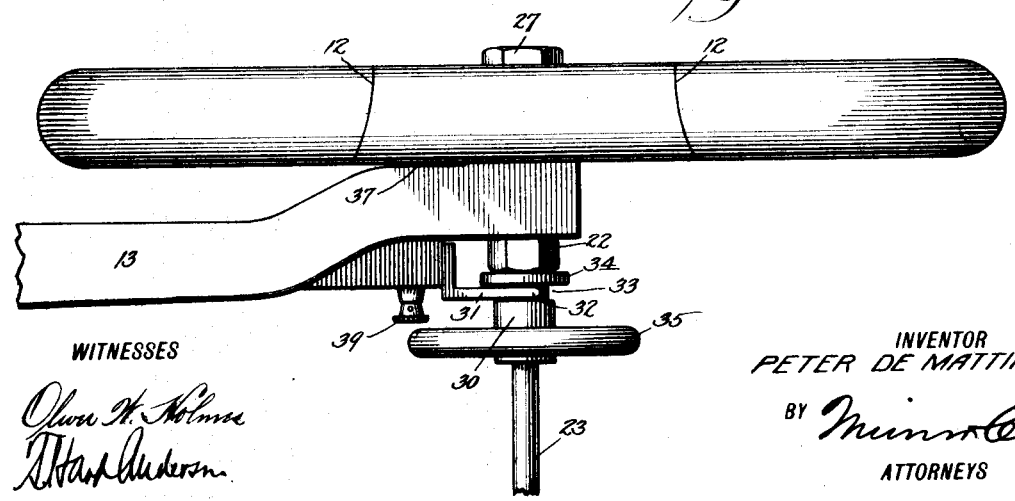
Fig. 2 shows a side elevation, or edge view, of the collapsible core, also showing parts of the operating instrumentalities.

As shown in the drawings the apparatus comprises two groups of core sections (1 and 2), there being three sections in each group, as illustrated, and preferably the sections in one group will be relatively longer than the sections in the other group, as indicated in Figs. 1 and 2, in which the sections (1) are longer than sections (2).

As shown in Figs. 1 and 2, the six core sections of the two groups when moved to place the sections in the same plane, produce a complete circular core.

A suitable support or chuck is provided for the core, whereby it is supported and may be revolved as required, during the operations incident to the building up of the tire thereon. The chuck comprises two members (3 and 4) each of which constitutes an independent support for a group of core sections. The chuck member (3) is provided with radial arms (5) to which the core sections (2) are pivotally connected at the outer end of the arms (5) by means of the pivots (6). The chuck member (4) is provided with the radial lugs or ears (7) to which the radial arms (8) of the core sections (1) are pivoted by means of the pivots (9).

It is to be observed that by reason of the difference between the positions of the pivots (6 and 9) with relation to the center of the chuck, the extent of the pivotal action or movement of the core sections of one group varies considerably as compared with the movement or pivotal action of the sections comprising the other group, thus the core sections (2) carried by the chuck member (3) have a relatively short pivotal movement, whereas the core sections (1) carried by the chuck member (4) have a pivotal movement of considerable extent, this arrangement being adopted for a purpose which will be hereinafter fully disclosed.

It is intended that the core sections shall swing in the same direction, but shall be prevented from swinging in the reverse direction from a point at which the core sections are in operative position and from an unbroken continuity of the segmental sections, and for this purpose the core sections (2) are provided with stops (10) arranged to engage with the arms (5), and the arms (8) of the core sections (1) are provided with stops (11) arranged to engage the peripheral edge of the chuck member (4) at one side of the pivots (9). This arrangement absolutely prevents any movement of the core sections downward, as the parts are shown in Figs. 3 and 4, after they have been brought into operative continuity, and results in the stripping of the tire from the core sections (2) when the core sections (1) are moved away from the core sections (2), as will be hereinafter described.

To assist in maintaining the rigid continuity of the core sections when in operative position, the meeting ends of adjacent core sections will be formed on reversely beveled lines (12), as shown in Figs. 1 and 2, the beveled surfaces being so formed as to permit freedom of movement of the sections (1) with relation to sections (2) in making and breaking the continuity of the core, or while moving into an operative position, as shown in Figs. 1, 2 and 3, to the position shown in Figs. 4 and 5.

The chuck members with their connected core sections will be mounted upon a suitable jack or support so that they may be freely turned as the operator manipulates the tire thereon, and as shown in the drawings the jack comprises a supporting arm (13) which at its outer end is provided with a cylindrical bearing (14) in which is fitted a sleeve (15). The sleeve (15) at its upper end is provided with an enlargement (16), thus providing a shoulder (17) which rests upon the upper surface of the arm (13), and at its extreme upper end it is provided with an outwardly extending flange (18). The chuck member (3) is provided with a central bore or opening (19) to receive the enlargement (16) of the sleeve (15) and with a counter sunk recess (20) upon its upper surface surrounding the bore (19) to receive the flange (18). The chuck member (3) rests upon the upper surface of the arm (13) and is held thereon by the sleeve (15) so that it may be freely turned thereon, the sleeve (15) being screw threaded at its lower end as shown at (21), to receive the threaded nut (22) by means of which the sleeve (15) and the chuck member (3) are held securely attached to the outer end of the arm (13) and in such manner that the chuck member (3) may be freely turned thereon. The chuck member (4) rests upon the upper surface of the chuck member (3) and it is connected to the upper end of a rod (23), which rod passes freely through the sleeve (15). The upper free end of the rod (23) is provided with a flanged head (24) seated in a recess (25) in the upper surface of the chuck member (4). The recess (25) is provided with an upper threaded portion (26) in which is screwed a threaded plug (27) which bears against the upper surface of the flanged collar (4). The foregoing arrangement is such that the chuck member (4) is free to revolve about the head (24) but partakes of the movement of the rod (23).

It will be observed that a movement of the rod (23) from the position shown in Fig. 3 to the position shown in Fig. 4, carries with it the chuck member (4) and the core sections (1) carried by the arms (8), and that during this movement the arms (8) and the chuck sections (1) will not be permitted to move in a reverse direction, but at the initial movement, the core members (2) begin to turn about their pivots (6) thus permitting the tire to be stripped therefrom and carried forward or upward with the core sections (1), as the case may be, dependent upon whether the device is operated in a vertical or horizontal position.

The movement of the chuck member (4) is produced by the movement of the rod (23) which is threaded for a portion of its length as shown at (28), the threaded portion passing through and engaging the internal threads 29 of a sleeve (30) which engages the rod (23) beneath the forward end of the arm (13). The sleeve (30) is held in a fixed position in contact with the nut (22) by means of a bracket (31) fixedly secured to the arm (13) and which, at its forward end, is forked as shown at (32); the forked end (32) engaging a groove (33) beneath a collar or head (34). The sleeve (30) is provided with any suitable means whereby it may be readily turned such as the hand wheel (35). By turning the hand wheel (35), the threaded sleeve engaging the threaded end of the rod (23) causes the rod to move through the sleeve (15) carrying with it the chuck member (4). When the parts are in a position shown in Figs. 1, 2 and 3, with the core sections in operative continuity, there is of course no relative turning movement between the chuck members (3 and 4) and they turn together. In order to prevent accidental turning of the chuck and core, the under surface of the chuck member (3) is provided with radial notches (36) adapted to be engaged by a latch (37), mounted in the arm (13) and pressed upward by a spring (38). The lower end of the latch is provided with a head (39) whereby it may be grasped by the operator and the latch withdrawn so as to disengage it from the notches and permit the turning of the chuck and core.

The arm (13) as is usual in such devices may be removably mounted so as to be freely turned in the upper end of a standard (40), and a locking lever (41), operated by instrumentalities not shown in the drawings, engages a flanged collar (42) to hold the arm (13) in any desired position.

In operation the parts are positioned as shown in Figs. 1, 2, 3 and 4 and held in that position while the tire is in process of being built up. When it is desired to remove the tire from the core the hand wheel (35) is turned so as to cause the sleeve (30) to move the rod (23) upward or forward, thus carrying with it the chuck member (4) and the core sections (1), the stops (11) of the arms (8) rigidly holding the core sections (1) with the tire thereon during this movement. As this movement begins, inasmuch as the chuck member (3) and its radial arms (5) are held from movement in the direction of movement of the chuck member (4), the core sections (2) will be rocked about their pivots (6) and the tire will be automatically stripped therefrom. Afterward the tire may be grasped and stripped from the core sections (1), the pivotal action of the levers (8) assisting in such stripping. After the tire has been removed the core sections (1 and 2) drop back into operative position and a reverse movement of the rod (23) brings the core sections into operative continuity ready for the building up of another tire.

It will of course be understood, that a practical apparatus may be produced without forming the chuck in two members and without providing the threaded rod and other instrumentalities for separating the chuck members, to produce the relative movement of the groups of core sections, for with the core sections divided into groups and each group of core sections having the pivotal connections with the chuck as shown in the drawings and described in the specification, a tire may be stripped therefrom by simply exerting a pull thereon in the direction of movement permitted by the pivotal connections of the core sections.

It will be further observed that the difference in the position of the pivots of the respective core sections with relation to the center of the chuck, producing a relatively greater movement in one group of core sections than in the other, provides for a relatively quicker stripping of the tire from one group of core sections than the other. In other words, pressure on the tire sufficient to move the core sections in that direction permitted by the pivotal connections, will result in the stripping of the tire from one group of core sections and then the other, successively and progressively.

The present invention, therefore, is not limited to an apparatus embodying any means for positively moving one chuck member and its core sections with relation to the other chuck member and its core sections.

Having described my invention, I claim:

1. A collapsible core comprising a plurality of segmental core sections, independent supports for each section, and pivotal connections between the core sections and their supports permitting movement of the core sections into and out of operative continuity in a direction transverse to the plane of the core sections out of said plane.

2. A collapsible core comprising a plurality of segmental core sections, independent supports for each section, and movable connections between the core sections and their supports permitting movement of the core sections into and out of operative continuity in one direction from the plane of the core and transversely thereto out of said plane.

3. A collapsible core comprising a plurality of segmental core sections, independent supports for each section, movable connections between the core sections and their supports permitting movement of the core sections in the same direction from a position of operative continuity transversely to the plane of the sections and stops to prevent movement in the reverse direction out of said plane.

4. A collapsible core comprising a plurality of segmental core sections, independent support for each section, pivotal connections between the core sections and their supports permitting movement of the core sections into and out of operative continuity in a direction transversely to the plane of the core sections and out of said plane, the core sections having complementary beveled ends, the bevel at opposite ends extending in opposite directions.

5. In combination, a chuck comprising two members, a group of segmental core sections supported by each of the chuck members and means to move one of the chuck members and its segmental core sections with relation to the other chuck member and its segmental core sections, whereby to move said groups of core sections out of and into operative continuity.

6. In combination, a chuck comprising two superimposed members, a plurality of segmental core sections carried by each of the chuck members, means to move one of the chuck members with relation to the other chuck member and movable connections between the segmental core sections carried by one of the members permitting a movement of the core sections in a direction transversely to the plane of the core.

7. In combination, a chuck comprising two superimposed members, a plurality of segmental core sections carried by each of the chuck members, movable connections between the segmental sections and the chuck members permitting movement of the core sections transversely to the plane of the core in one direction, stops to prevent movement of the core sections with relation to the chuck members in the reverse direction, and means to move the chuck members with relation to each other, whereby to make and break the operative continuity of the core.

8. In combination, a chuck comprising two superimposed members, a plurality of segmental core sections pivotally mounted upon the chuck members, the pivots of one group of core sections being at a greater distance from the center of the chuck members than the pivots of the other group of core sections, and means to move the chuck members toward and from each other, whereby to make and break the operative continuity of the core.

9. In combination, a chuck, two groups of segmental core sections pivotally connected to the chuck for movement in a direction transverse to the plane of the core, the pivots of one group of core sections being at a greater distance from the center of the chuck than the pivots of the other group of core sections.

10. In combination, a chuck, two groups of core sections pivotally connected to said chuck to move into and out of the plane of the chuck, the pivots of one group of core sections being at a greater distance from the center of the chuck than the pivots of the other group of core sections, stops to prevent the movement of the core sections in one direction out of the plane of the core, and the core sections provided with complementary beveled ends.

11. In combination, a chuck comprising two superimposed members, a jack or support upon which said chuck members are revolubly mounted, a core comprising a plurality of segmental core sections divided into groups carried by the chuck members, pivotal connections between the core sections and the chuck members permitting movement of the core sections in a direction transverse to the plane of the core, and means to move one of the chuck members and its group of core sections with relation to the other chuck member and its group of core sections.

12. In combination, a chuck comprising two superimposed members, a jack or support upon which said chuck members are revolubly mounted, core sections carried by each of the chuck members, movable connections between the core sections and the chuck members, and a threaded rod engaging one of the chuck members for moving said chuck member and its core sections with relation to the other chuck member and its core sections.

13. In combination, a collapsible core comprising a plurality of segmental core sections arranged in independent groups, the sections in one group being alternately arranged with relation to and fitting between the sections in the other group, independent supports for the core sections and means connecting the core sections to their supports for movement thereon in a direction transversely to the plane of the core and into and out of said plane.

14. In combination, a collapsible core comprising a plurality of segmental core sections arranged in independent groups, the sections of one group being alternately arranged with relation to and fitting between the sections in the other group, independent supports for the core sections, and means for connecting the sections to their supports for movement into and out of a position of operative continuity in a direction transversely to the plane of the core, the members of one group having a greater range of movement than the members of the other group.

PETER DE MATTIA.